United States Patent
Spyropoulos et al.

(10) Patent No.: US 11,711,149 B2
(45) Date of Patent: Jul. 25, 2023

(54) MULTI-WAVEFORM DIGITAL PREDISTORTION CALIBRATION

(71) Applicant: Maxlinear, Inc., Carlsbad, CA (US)

(72) Inventors: Ioannis Spyropoulos, La Jolla, CA (US); Anand Anandakumar, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 313 days.

(21) Appl. No.: 16/379,759

(22) Filed: Apr. 9, 2019

(65) Prior Publication Data

US 2019/0312650 A1 Oct. 10, 2019

Related U.S. Application Data

(60) Provisional application No. 62/654,585, filed on Apr. 9, 2018.

(51) Int. Cl.
    *H04B 10/564* (2013.01)
(52) U.S. Cl.
    CPC .................. *H04B 10/564* (2013.01)
(58) Field of Classification Search
    CPC ................ H04B 10/073; H04B 10/5057
    See application file for complete search history.

(56) References Cited

U.S. PATENT DOCUMENTS

| | | | | |
|---|---|---|---|---|
| 6,009,189 A | * | 12/1999 | Schaack | A61B 1/00147 348/137 |
| 2010/0303472 A1 | * | 12/2010 | Miller | H01S 5/06832 398/195 |
| 2015/0326327 A1 | * | 11/2015 | Carlsson | H03F 1/0222 375/224 |
| 2017/0180053 A1 | * | 6/2017 | Lozhkin | H04B 10/564 |
| 2017/0318589 A1 | * | 11/2017 | Negus | H01Q 21/205 |
| 2018/0109318 A1 | * | 4/2018 | Castro | H04B 10/07953 |
| 2019/0074903 A1 | * | 3/2019 | Takamuku | H04B 10/2507 |

OTHER PUBLICATIONS

U.S. Appl. No. 16/376,504, filed Apr. 5, 2019.

* cited by examiner

*Primary Examiner* — Shi K Li
(74) *Attorney, Agent, or Firm* — Buchalter; Jason W. Croft (57) ABSTRACT

A calibration system comprises control circuitry and waveform capture circuitry. The control circuitry selects a first calibration waveform for input to a digital predistortion circuit of a transmitter. The capture circuitry captures a first waveform output by the transmitter in response to the first calibration waveform. The control circuitry compares the first calibration waveform to the captured first waveform. The control circuitry selects a first one of a plurality of mapping circuit configurations based on the result of the comparison, wherein the mapping circuit is configured to map outputs of a plurality of delay circuits among inputs of a plurality of filter taps. The control circuitry stores the one of the mapping circuit configurations in nonvolatile memory associated with the transmitter.

10 Claims, 5 Drawing Sheets

MULTI-WAVEFORM DIGITAL PREDISTORTION CALIBRATION

PRIORITY CLAIM

This application claims priority to U.S. provisional application 62/654,585, titled "Multi-Waveform Digital Predistortion Calibration" filed on Apr. 9, 2019, the entirety of which is hereby incorporated herein by reference in its entirety.

BACKGROUND

Limitations and disadvantages of conventional approaches to digital predistortion will become apparent to one of skill in the art, through comparison of such systems with some aspects of the present invention as set forth in the remainder of the present application with reference to the drawings.

BRIEF SUMMARY

Systems and methods for multi-waveform digital predistortion calibration, substantially as shown in and/or described in connection with at least one of the figures, as set forth more completely in the claims.

Advantages, aspects, and novel features of the present disclosure, as well as details of various implementations thereof, will be more fully understood from the following description and drawings.

DETAILED DESCRIPTION OF THE INVENTION

Figure 1A:
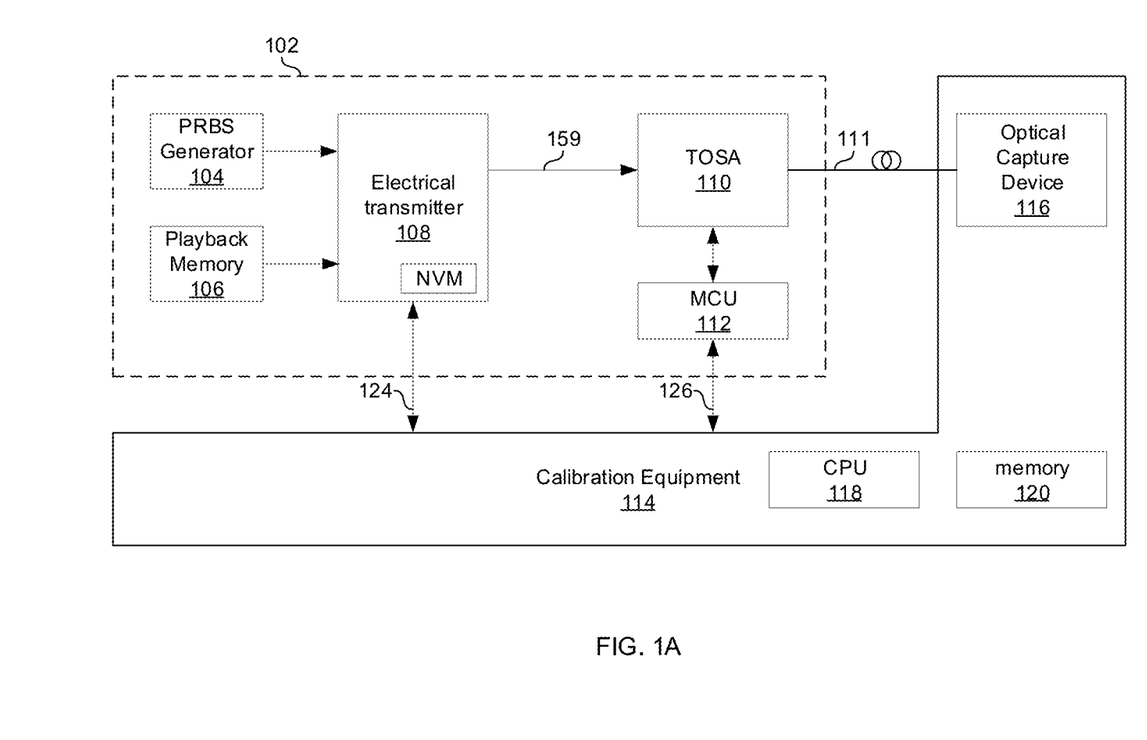
FIG. 1A shows calibration setup for calibrating a digital predistortion circuit in an electro-optical transmitter module.

FIG. 1A shows a calibration setup for calibration of a digital predistortion circuit. Shown is electro-optical transmit circuitry 102 coupled to a calibration equipment 114. The calibration equipment 114 comprises a processor 118 and memory 120 and an optical capture device 116. The electro-optical transmit circuitry 102 comprises a pseudo-random binary sequence (PRBS) generator 104, a playback memory 106, an electrical transmitter 108, a transmit optical subassembly (TOSA) 110, and a microcontroller unit (MCU) 112.

The processor 118 and memory 120 interoperate to execute a calibration routine that communicates with the electrical transmitter 108 via bus 124 (e.g., SPI, I2C or other serial interface) and the MCU 112 via bus 126 (e.g., SPI, I2C or other serial interface) to, for example, store values (e.g., filter tap coefficients, gain settings, etc.) to nonvolatile memory (NVM) of the electrical transmitter 108 and nonvolatile memory of the MCU 112.

The optical capture device 116 is operable to capture (e.g., convert to electrical, sample, demodulate, decode, and/or otherwise process) the optical signal output by TOSA 110 on optical fiber cable 111 to enable comparing: (1) the output signal of the TOSA 110; and (2) a calibration signal provided by the PRBS generator 104 and/or the playback memory 106, or a predistorted version of it. In an example implementation, the optical capture device 116 is a piece of laboratory equipment such as a real-time or sampling oscilloscope or spectrum analyzer. In an example implementation, the optical capture device 116 is the optical receiver of a reference system comprising an instance of electro-optical transmit circuitry 102 (e.g., 102 may be a circuit assembly (module) intended for installation in a high-speed optical Ethernet port on a server inside a data center and 116 may be the receiver of the same module or a different well-characterized ('golden') module). In an example implementation, the optical capture device 116 may take advantage of the periodicity of the calibration waveform (e.g. PRBS waveform) to reduce the effect that random capture noise introduced by the optical capture device 116 has on the accuracy on the TX predistortion calibration. Specifically, the optical capture device 116 may capture multiple periods of the waveform output by the TOSA 110 and then, prior to estimating the predistortion coefficients, average across the multiple periods to eliminate the effect of noise.

The pseudorandom binary sequence (PRBS) generator 104 is operable to generate a pseudorandom binary sequence for use in calibrating the digital predistortion circuit 152.

The playback memory 106 is operable to store digital samples of one or more waveforms and stream out a selected one of the waveforms when instructed to do so (e.g., in response to a command from the calibration equipment 114).

An example implementation of the electrical transmitter 108 is described below with reference to FIG. 1B.

The transmit optical subassembly (TOSA) 110 comprises circuitry operable to receive electrical signal 159 and convert it to an optical signal for output onto optical fiber cable 111. The TOSA 110 may comprise, for example, a laser diode and an electro-optic modulator (e.g. electro-absorption externally modulated laser, or Mach-Zehnder modulator, or directly modulated laser).

The microcontroller 112 comprises circuitry (e.g., volatile memory, nonvolatile memory, and a CPU) operable to communicate with the calibration equipment 114 via bus 126 and to configure the TOSA 110.

Figure 2:
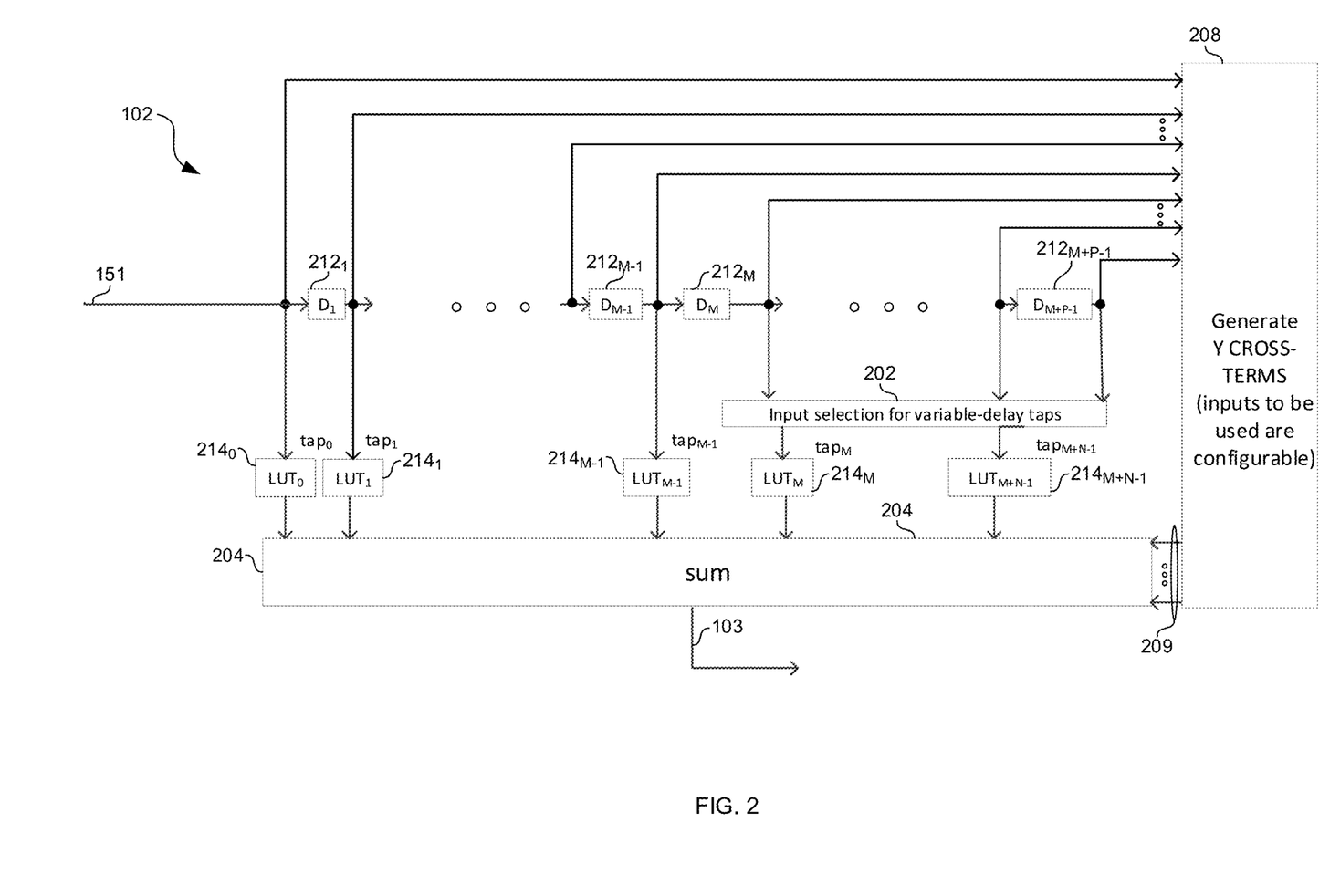
FIG. 2 shows an example implementation of the configurable digital predistortion circuit of FIG. 1B.

The calibration equipment 114 comprises circuitry operable to communicate with controller the electrical transmitter 108 and the microcontroller 112 to monitor and control operation of the electro-optical transmit circuitry 102 during a calibration routine (e.g., to program the lookup tables LUTs $214_0$-$214_{M+N-1}$ and the cross-terms generator 208 in FIG. 2). The calibration equipment comprises control circuitry (e.g., a microprocessor and memory) and an optical capture device (e.g., operable to capture and digitize the optical waveform on fiber 111).

Figure 1B:
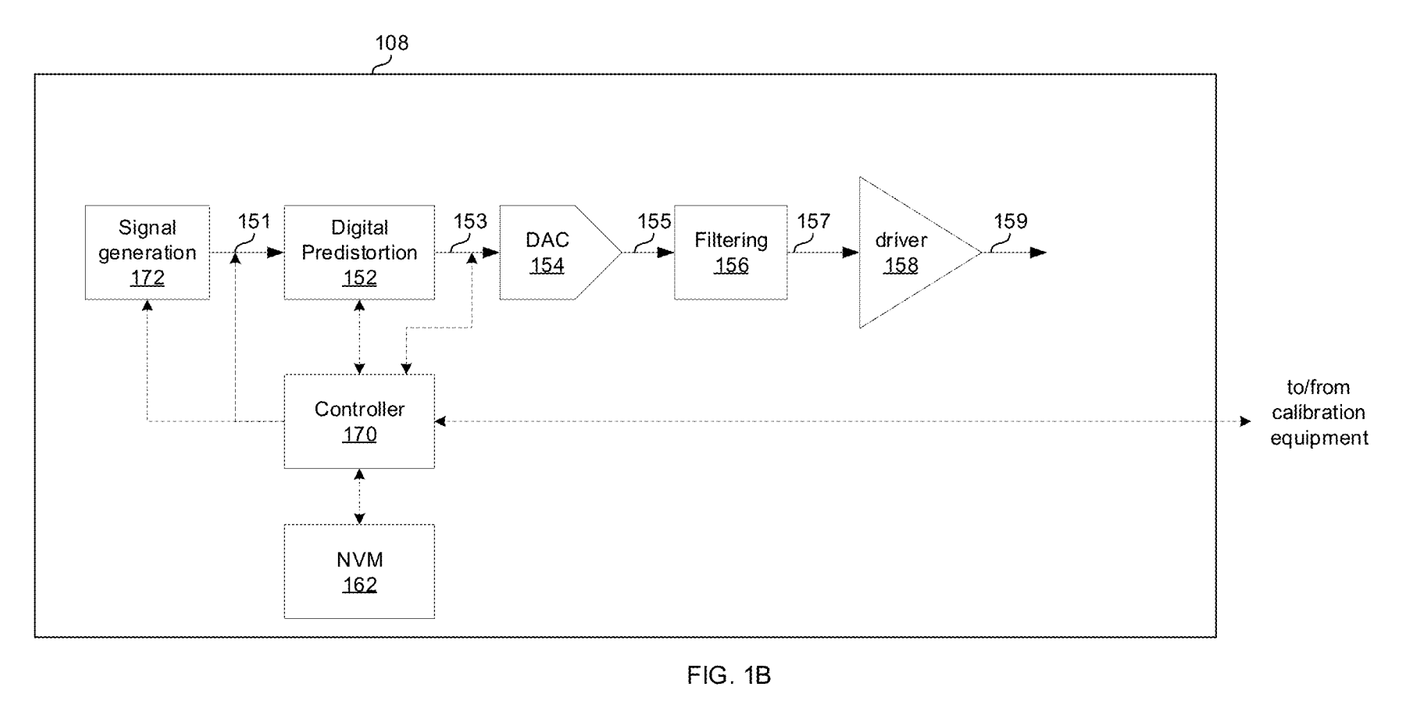
FIG. 1B shows example circuitry of an electrical transmitter comprising a configurable digital predistortion circuit.

FIG. 1B shows example circuitry of an opto-electric transmitter 100 comprising a configurable digital predistortion circuit. Shown are configurable digital predistortion circuit 152, digital to analog converter (DAC) circuit 154, filtering circuit 156, driver circuit 158, controller 170, signal generation circuit 172, and nonvolatile memory circuit 162. Other circuitry of the electrical transmitter 108 is not shown for clarity of illustration.

The controller 170 comprises circuitry operable to configure and control operations of the electro-optical transmit circuitry 102. The controller may read parameters/settings from NVM 162 and write those parameters to one or more of circuit(s) 172, 152, 154, 156, and/or 158. Similarly, the controller 170 may monitor and/or take measurements of one or more of the circuit(s) 172, 152, 154, 156, and/or 158 and/or one or more of signals 151, 153, 155, 157, and 159 and may store the results of the monitoring and/or measurement to NVM 162. The controller 170 may also comprise other sensors such as a temperature sensor for monitoring the temperature of the electro-optical transmit circuitry 102. The digital predistortion circuit 152 may be configured dynamically during operation of the electro-optical transmit circuitry 102 after it is deployed in the field (such as in a hybrid fiber-coaxial network of a cable provider or in high-speed Ethernet optical links inside data centers or interconnecting data centers) based on temperature and/or other parameters such as measured signal levels.

The nonvolatile memory 162 comprises any suitable type of nonvolatile memory such as FLASH, EEPROM and/or the like.

The digital predistortion circuit 152 is operable to pre-distort the signal 151 to compensate for nonlinearity and memory effects introduced by subsequent circuits in the electrical transmitter 108 (e.g., by the DAC 154, filter 156, driver 158, and/or the TOSA 110, which are, generally, nonlinear and/or bandwidth-limiting circuits). In a typical implementation, the nonlinearity and bandwidth limitation may be dominated by the driver 158 and the TOSA 110. The nonlinearity and memory effects degrade the signal integrity of the transmitted signal, which must be kept within strict limits, typically, specified by high-speed interconnect industry standards (e.g. the IEEE 802.3bs and 802.3cd standards) to ensure interoperability of one manufacturer's transmitter with other manufacturers' receivers. The digital predistortion circuit 152 is designed and calibrated for improving the transmitted signal integrity within the limits specified by the standards. That is, the overall response from signal 151 to signal 159 is more linear and frequency 'flat' (i.e. less frequency selective) with the predistortion circuit 152 than without the digital predistortion circuit 152 (i.e., more linear and frequency 'flat' than if signal 151 was input directly to the DAC 154). As described in more detail below with reference to FIG. 2, the digital predistortion circuit 152 is configurable to compensate for variations among different transmitters. Such variations may include, for example, differences in the circuit(s) 154, 156, 158 and/or 110 and/or their layout among different makes and models of the system comprising electrical transmitter 108 and TOSA 110). Additionally, or alternatively, such variations may include, for example, process, temperature, and/or voltage variations which may, for example, result in different amounts of mismatch between RF circuits (and resulting reflections) in different instances of the same make and model of transmitter.

The digital to analog converter (DAC) circuit 154 is operable to convert the digital signal 153 to an analog representation 155.

The filtering circuit 156 is operable to perform anti-aliasing and/or other filtering of the signal 155 to generate the signal 157.

The driver 158 is operable to condition the signal 157 (e.g., amplify its voltage, amplify the current, convert its current to a voltage, and/or convert its voltage to a current) to generate the signal 159. Output signal 159 can be coupled to the TOSA in differential more or single-ended mode.

In an example implementation, the calibration equipment 114 provides a test signal comprising encoded symbols which the controller 170 then feeds into the digital predistortion circuit 152 as signal 151 or into the DAC circuit 154 as signal 153. For example, the calibration equipment 114 may store a waveform to memory 162 and/or memory of the controller 170, and then that waveform may be streamed out as signal 151 or signal 153 during calibration. In another implementation, the electrical transmitter 108 may comprise its own signal generation circuitry 172 (e.g., may comprise a playback memory from which samples of a waveform can be streamed and/or may comprise a pseudorandom pattern generator which may generate signal) and the signal 151 may be generated by the circuitry 172 rather than by the calibration equipment 114 (the calibration equipment 114 may, however, instruct which waveform to play at which time).

FIG. 2 shows an example implementation of the configurable digital predistortion circuit of FIG. 1B. The example predistortion circuit 152 comprises a plurality of delay circuits $212_1$-$212_{M+P-1}$, a plurality of lookup table (LUT) circuits $214_0$-$214_{M+N-1}$, a variable-delay taps selection circuit 202, a cross-terms generation circuit 208, and a summing circuit 204. Each of M, N, and P are integers, and N is smaller than P.

Each of plurality of delay circuits $212_1$-$212_{M+P-1}$ may comprise, for example, a register. Delay elements $212_1$ to $212_{M-1}$ (where M is an integer) have their outputs coupled to a respective one of LUTs $214_1$-$214_{M-1}$. Delay elements $212_M$ to $212_{M+P-1}$ have their outputs coupled to selection circuit 202.

Each lookup table (LUT) circuit $214_z$ (where z is an integer and 0≤z≤M+N−1) comprises a lookup table populated with values according to a predetermined polynomial to be realized by the z-th tap. For example, the input signal may be a PAM-K (where K is an integer in general and is typically a power of 2-4, 8, 16, etc.) signal and each lookup table circuit 214 may store the K outputs of the polynomial corresponding to the K possible input values. Filter taps $214_0$-$214_{M-1}$ are referred to herein as "fixed-delay" taps since which of delay elements $212_1$-$212_{M-1}$ is coupled to each of LUTs $214_0$-$214_{M-1}$ is fixed. Filter taps $214_M$-$214_{M+N-1}$ are referred to herein as "variable-delay" taps since which of delay elements $212_M$-$212_{M+P-1}$ is coupled to each of LUTs $214_M$-$214_{M+N-1}$ is variable.

The variable-delay taps selection circuit 202 is configurable to select which of the delay elements $212_M$ to $212_{M+P-1}$ are coupled to respective ones of the LUTs $214_M$ to $214_{M+N-1}$. This ability to dynamically configure the delay for taps $214_M$ to $214_{M+N-1}$ enables compensating for variations between different implementations of transmitter 100. For example, different ones of the delays $212_M$ to $212_{M+P-1}$ may be selected for different makes and/or models of the circuits 104, 106, 108, and/or 110, for different layouts of the circuits 104, 106, 108, and/or 110 (e.g., different trace lengths and/or impedances between the electrical transmitter 108 and TOSA 110 leading to different reflection characteristics), and/or for variations in process, temperature, and/or voltage.

The cross-terms generation circuit 208 is operable to generate Y (an integer) cross-term signals 209 that compensate for nonlinearities not compensated for by the finite number, M+N, of taps. The cross-terms generation circuit 208 may, for example, enable compensating for nonlinear terms (i.e., cross products) that arise with cascaded and bandwidth-limited nonlinear circuits. These terms may be the result of multiplication of multiple differently-delayed (and, optionally, weighted by coefficients) versions of the input signal.

The summing circuit 204 is operable to sum: the outputs of taps $214_0$ to $214_{M+N-1}$ and the cross-terms 209. The result of the summation is the signal 103.

Figure 3:
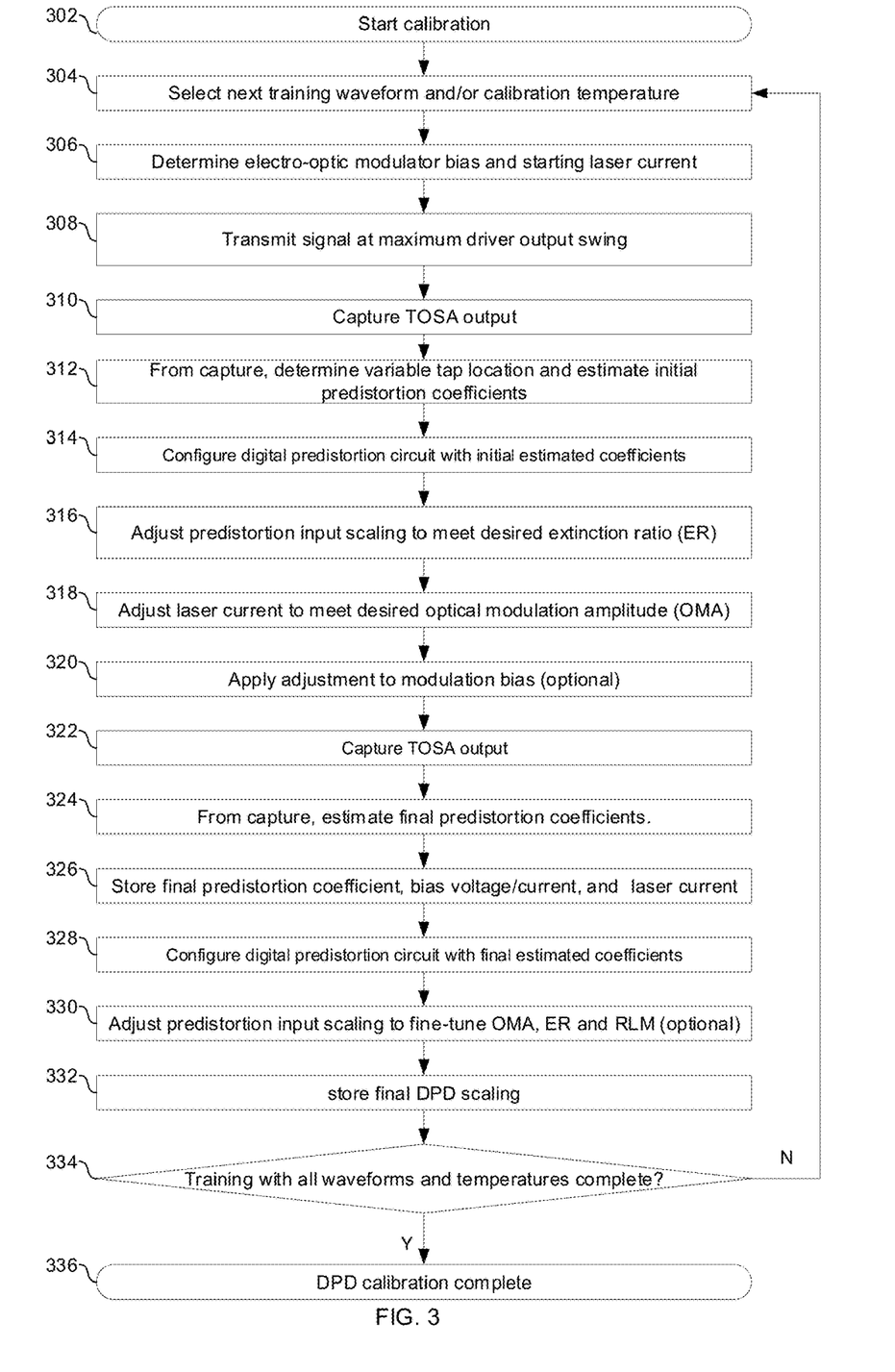
FIG. 3 is a flowchart illustrating an example process for calibrating the digital predistortion circuit of FIG. 2 in the setup of FIG. 1A.

FIG. 3 is a flowchart illustrating an example process for calibrating the digital predistortion circuit of FIG. 2 in the setup of FIG. 1A. The process begins with block 302 in which the electrical transmitter 108 and TOSA 110 are hooked up to the calibration equipment 114.

In block 304, a next waveform to use for calibration, and/or next temperature at which to perform calibration, is selected. The waveform may be generated by the PRBS generator 104 or may be streamed out of the playback memory 106. At a given calibration temperature, different ones of the calibration signals may be selected to achieve different calibration results. For example, a first calibration signal may be selected to make the overall response of the electrical transmitter 108 as linear and frequency 'flat' as possible at the expense of more peak-to-average power ratio (PAPR) expansion of the signal 159 (which results in less signal swing of the optical signal on fiber 111 for a given DAC dynamic range), and a second calibration signal may be selected to limit PAPR expansion (which results in more signal swing of the optical signal on fiber 111 for a given DAC dynamic range). For example, a first calibration waveform may approximate, as closely as possible given design constraints, an ideal (i.e., infinite bandwidth square pulse) PAM-4 signal and a second calibration waveform may be a pre-emphasized PAM-4 signal (i.e., deal PAM-4 signal filtered by a finite impulse response filter with programmable pre-emphasis levels) During runtime, the electro-optical transmit circuitry 102 may select from the calibration results obtained with the first calibration signal, the calibration results obtained with the second calibration signal, or some weighted combination of the two based on the conditions present at the time (e.g., temperature, length of the optical fiber cable 111, presence of other interference, etc.) in order to best take advantage of the link budget.

In block 306, the electro-optic modulator bias voltage or current and starting laser current of the TOSA are determined (e.g., calculated based on current conditions and then programmed into a configuration register) for given calibration temperature.

In block 308, the electrical transmitter 108 is configured to output signal 159 at (or near) maximum driver output swing in order to characterize the nonlinearity of the TOSA 110 over the entire range of operation. At this stage, the predistortion circuit is configured as a pass through filter so that the calibration signal at the input of the circuit is transferred unchanged, except maybe for a gain scaling, as signal 153 at the output of the circuit (i.e. input to the DAC).

In block 310, the output of the TOSA 110 is captured by the optical capture device 116.

In block 312, the calibration equipment 114 compares the captured waveform to the calibration waveform and, based on the result of the comparison, determines (e.g., using a least mean squares algorithm) which of delay circuits $212_M$ to $212_{M+P-1}$ should be connected to which of the LUTs $214_M$ to $214_{M+N-1}$ for the current calibration temperature and waveform. That is, the calibration equipment determines an optimal (or at least sufficient) configuration of tap selection circuit 202 for the current calibration temperature and waveform. The calibration equipment also determines (e.g., using a least mean squares algorithm) initial digital predistortion tap coefficients, i.e. coefficients of the polynomials used for generating entries in LUTs $214_0$ to $214_{M+N-1}$ as well as cross-term weight coefficients used for generating cross-term signals 209 that correspond to the current calibration temperature and waveform.

In block 314, the digital predistortion circuit 152 is configured based on the initial coefficients determined in block 312. This may comprise, for example the calibration equipment 114: calculating values with which to populate the LUTs $214_0$ to $214_{M+N-1}$ based on the determined coefficients and then loading those values into the LUTs $214_0$ to $214_{M+N}$ via the bus 124; and/or calculating the weights to be used in generating the cross-term signals and loading these weights into the cross-term generation circuit 208.

Figure 4:
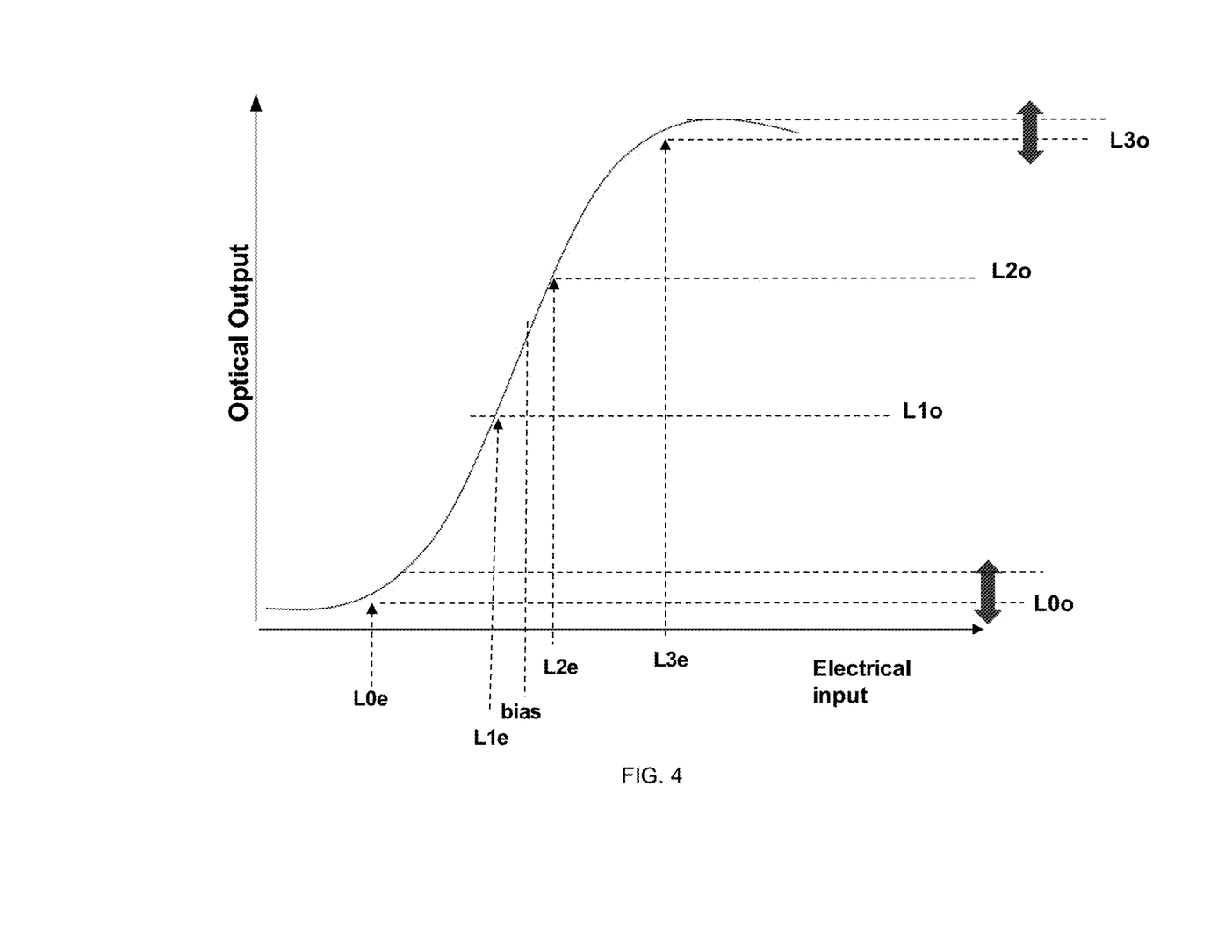
FIG. 4 shows the optical output vs electrical input curve of the transmit optical subassembly (TOSA) of FIG. 1A.

In block 316, scaling in the digital predistortion circuit is adjusted to achieve values of L3o and L0o (see FIG. 4) that meet a desired extinction ratio (ER). The desired extinction ratio may be determined based on the link budget for the application in which the transmitter is to be deployed. The extinction ratio of a digitally modulated optical signal is defined as the ratio of the maximum optical power level over the minimum mean optical power level transmitted. For example, in case of a PAM-4 modulated optical signal (as the one used in the IEEE802.3bs and IEEE802.3cd standards), the extinction ratio is defined as L3o/L0o, where L0o is the mean optical power corresponding to minimum PAM-4 level 0 and L3o is the mean optical power corresponding to minimum PAM-4 level 3, as shown in FIG. 4. In one example implementation, the input scaling in digital predistortion circuit 152 can be adjusted by appropriately scaling the polynomial coefficients (used to generate the output values in LUTs $214_0$ to $214_{M+N-1}$) as well as the weights used in generating cross-term signals 209.

In block 318, the laser current of TOSA 110 is adjusted to achieve a desired optical modulation amplitude (OMA). The desired OMA may be determined based on link budget requirements of the application in which the transmitter is to be deployed. Adjusting the laser current of TOSA results in adjusting the average laser output power $P_{avg}$ which, for given extinction ratio achieved in block 316, is related to optical modulation amplitude through the formula: $OMA = 2*P_{avg}*(ER-1)/(ER+1)$.

In block 320, the modulator bias voltage or current of the TOSA 110 is adjusted, as necessary, to bias the TOSA at (or near) the inflection point of its optical output vs electrical input characteristic, shown in FIG. 4.

In block 322, the output from the TOSA 110 is captured a second time by optical capture device 116. This time, the predistortion circuit 152 is configured based on the initial coefficients estimated in block 312.

In block 324, the calibration equipment 114 compares the captured waveform to the predistortion circuit output waveform 153, corresponding to the calibration waveform generated by PRBS generator 104 or playback memory 106 in order to estimate the final digital predistortion coefficients. The predistortion output waveform can be captured by means of digital capture logic at the DAC input interface and transferred to calibration equipment 114 via the serial bus 124. The estimated predistortion coefficients include the polynomial tap coefficients (used for generating tap the output values of LUTs $214_0$ to $214_{M+N-1}$) as well as cross-term weight coefficients used for generating cross-term signals 209. In an example implementation, the polynomial coefficients and cross-term weights are determined as follows: the calibration equipment 114 emulates the predistortion circuit 152 for M fixed taps, the determined N variable taps and Y cross-terms, with TOSA output captured signal being the emulator input. The polynomial coefficients and cross-term weights are iteratively adjusted until the emulator output closely 'matches' predistortion circuit output waveform 153 (e.g., using a least mean squares algorithm).

In block 326, the final predistortion tap coefficients and cross-term weights determined in block 324, as well as the modulator bias voltage or current and laser current determined in blocks 318 and 320, are stored (e.g., in nonvolatile memory 162).

In block 328, the digital predistortion circuit 152 is configured based on the final coefficients determined in block 326. This may comprise, for example, the calibration equipment 114: calculating the output values of the LUTs $214_0$ to $214_{M+N}$ corresponding to input PAM-4 signal levels based on the coefficients determined in block 324 and then loading those values into the LUTs $214_0$ to $214_{M+N}$ via the bus 124; and/or calculating the weights to be used in generating the cross-term signals and loading these weights into the cross-term generation circuit 208.

In block 330, the input scaling in the digital predistortion circuit is further adjusted, optionally, to fine tune desired OMA, ER, and ratio of level mismatch (RLM) at the TOSA output, as measured and reported by the optical capture device 116. In one example implementation, the input scaling in digital predistortion circuit 152 can be adjusted by appropriately scaling the polynomial coefficients (used to generate the output values in LUTs $214_0$ to $214_{M+N-1}$) as well as the weights used in generating cross-term signals 209.

In block 332, the input predistortion scaling settings are stored (e.g., in NVM 162 of electrical transmitter 108).

In block 334, the calibration equipment 114 determines whether calibration has been performed over all waveforms and all temperatures. If not, the process returns to block 304. Otherwise calibration is complete and the process advances to block 336.

In accordance with an example implementation of this disclosure a calibration system (e.g., 114) comprises control circuitry (e.g., 118 and 120) and waveform capture circuitry (e.g., 116). The control circuitry selects a first calibration waveform for input to a digital predistortion circuit (e.g., 152) of a transmitter (e.g., 108). The capture circuitry captures a first waveform output by the transmitter in response to the first calibration waveform. The control circuitry compares the first calibration waveform to the captured first waveform. The control circuitry selects a first one of a plurality of mapping circuit configurations based on the result of the comparison, wherein the mapping circuit (e.g., 202) is configured to map outputs of a plurality of delay circuits (e.g., $212_M$-$212_{M+P-1}$) among inputs of a plurality of filter taps. The control circuitry stores the one of the mapping circuit configurations in nonvolatile memory (e.g., 162) associated with the transmitter. The control circuitry may determine a filter tap configuration to use based on the result of the comparison, and store the determined filter tap configuration in nonvolatile memory associated with the digital predistortion circuit. The filter tap configuration may comprises one or more lookup table. The control circuitry may be operable to select the first calibration waveform from among a plurality of calibration waveforms based on a desired characteristic (e.g., a desired amount peak-to-average-power ratio expansion introduced by the transmitter to the waveform output by the transmitter). The transmitter may comprises a laser diode, and the control circuitry may be operable to determine, based on the captured first waveform, an input current setting and/or bias voltage setting to be used for the laser diode (e.g., part of 110), and store the input current setting and/or bias voltage setting in nonvolatile memory associated with the transmitter. Each of the plurality of mapping configurations may correspond to a different mapping of the outputs of the plurality of delay circuits among the plurality of filter taps. The control circuit may select a second calibration waveform for input to the digital predistortion circuit of the transmitter. The waveform capture circuitry may capture a second waveform output by the transmitter in response to the second calibration waveform. The control circuitry may compare the second calibration waveform to the captured second waveform, select a second one of the plurality of mapping circuit configurations based on the result of the comparison of the second calibration waveform and the captured second waveform, and store the second one of the plurality of mapping circuit configurations in nonvolatile memory associated with the transmitter. The first calibration waveform may have different phase, frequency, and/or amplitude characteristics than the second calibration waveform (e.g., the first calibration waveform may be a pseudo-random sequence of symbols and the second may be a predetermined sequence of symbols). The calibration system may be operable to perform the selection of the first calibration waveform, the capture, the comparison, the selection of the first one of the plurality of mapping circuit configurations, and the storage for each of a plurality of calibration temperatures.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the methods described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    a calibration system comprising control circuitry and waveform capture circuitry, the calibration system being operable to:
        select, by the control circuitry, a first calibration waveform for input to a digital predistortion circuit of a transmitter, wherein the first calibration waveform is selected to reduce a frequency of an overall response of the transmitter;
        estimate, by the control circuitry, an initial predistortion coefficient based on the first calibration waveform;
        configure, by the control circuitry, the digital predistortion circuit with the initial predistortion coefficient;
        capture, by the waveform capture circuitry, a first waveform by the transmitter in response to the first calibration waveform and the initial predistortion coefficient;
        compare, by the control circuitry, the first calibration waveform to the captured first waveform;
        select, by the control circuitry, a first one of a plurality of mapping circuit configurations for the digital predistortion circuit based on the result of the comparing, wherein the mapping circuit is configured to map outputs of a plurality of delay circuits among inputs of a plurality of filter taps; and
        store, by the control circuitry, the first one of the mapping circuit configurations in nonvolatile memory associated with the transmitter.

2. The system of claim 1, wherein the control circuitry is operable to:
    determine a filter tap configuration to use based on the result of the comparison; and
    store the determined filter tap configuration in nonvolatile memory associated with the digital predistortion circuit.

3. The system of claim 2, wherein the filter tap configuration comprises one or more lookup table.

4. The system of claim 1, wherein the control circuitry is operable to select the first calibration waveform from among a plurality of calibration waveforms based on a desired characteristic of the transmitter after calibration.

5. The system of claim 4, wherein the desired characteristic is an amount of peak to average power ratio expansion introduced by the transmitter.

6. The system of claim 1, wherein and the transmitter comprises a laser diode, and the control circuitry is operable to:
    determine, based on the captured first waveform, an input current setting and/or bias voltage setting to be used for the laser diode; and
    store the input current setting and/or bias voltage setting in nonvolatile memory associated with the transmitter.

7. The system of claim 1, wherein each of the plurality of mapping circuit configurations corresponds to a different mapping of the outputs of the plurality of delay circuits among the plurality of filter taps.

8. The system of claim 1, wherein the calibration system is operable to:
    select, by the control circuitry, a second calibration waveform for input to the digital predistortion circuit of the transmitter;
    capture, by the waveform capture circuitry, a second waveform output by the transmitter in response to the second calibration waveform;
    compare, by the control circuitry, the second calibration waveform to the captured second waveform;
    select, by the control circuitry, a second one of the plurality of mapping circuit configurations for the digital predistortion circuit based on the result of the comparison of the second calibration waveform and the captured second waveform; and
    store, by the control circuitry, the second one of the plurality of mapping circuit configurations in nonvolatile memory associated with the transmitter.

9. The system of claim 8, wherein the first calibration waveform has different phase, frequency, and/or amplitude characteristics than the second calibration waveform.

10. The system of claim 1, wherein the calibration system is operable to perform the selection of the first calibration waveform, the capture, the compare, the select of the first one of the plurality of mapping circuit configurations, and the store for each of a plurality of calibration temperatures.

* * * * *